United States Patent [19]
Mori

[11] Patent Number: 4,659,176
[45] Date of Patent: * Apr. 21, 1987

[54] STRUCTURE AND IMPLEMENT FOR POSITIONING THE LIGHT-RECEIVING EDGE OF THE LIGHT CONDUCTOR ONTO THE FOCUS OF THE LENS

[76] Inventor: Kei Mori, 3-16-3-501, Kaminoge, Setagaya-ku, Tokyo, Japan

[*] Notice: The portion of the term of this patent subsequent to Apr. 16, 2002 has been disclaimed.

[21] Appl. No.: 566,073

[22] Filed: Dec. 27, 1983

[30] Foreign Application Priority Data

Dec. 31, 1982 [JP] Japan ................ 57-230792

[51] Int. Cl.⁴ ............................................. G02B 6/36
[52] U.S. Cl. .............................. 350/96.18; 350/96.10
[58] Field of Search ............... 350/96.15, 96.18, 96.19, 350/96.20, 96.21, 96.22

[56] References Cited

U.S. PATENT DOCUMENTS

| | | | |
|---|---|---|---|
| 3,576,563 | 4/1971 | Scott | 350/96.20 X |
| 3,938,895 | 2/1976 | Bridger et al. | 350/96.20 X |
| 4,290,667 | 9/1981 | Chown | 350/96.20 X |
| 4,303,301 | 12/1981 | Teichert et al. | 350/96.18 |
| 4,362,356 | 12/1982 | Williams et al. | 350/96.20 |
| 4,511,755 | 4/1985 | Mori | 350/96.10 X |

FOREIGN PATENT DOCUMENTS

| | | | |
|---|---|---|---|
| 0013356 | 1/1979 | Japan | 350/96.20 |
| 0113105 | 9/1981 | Japan | 350/96.18 |
| 0133705 | 10/1981 | Japan | 350/96.20 |

*Primary Examiner*—William L. Sikes
*Assistant Examiner*—Akm E. Ullah
*Attorney, Agent, or Firm*—Jordan and Hamburg

[57] ABSTRACT

A structure for positioning the light-receiving edge of an optical fiber comprises a large number of lens for focussing the light, and a large number of optical fibers, each having a photo-receiving edge arranged on the focus of the lens. A supporting plate has a large number of holes coaxial with each of the optical axis of said lens, and a retaining member retains the optical fiber movably along the direction of the optical axis. The retaining member is bound with an adhesive agent to the supporting plate, and the optical fiber is bound with an adhesive agent to the retaining member.

3 Claims, 2 Drawing Figures

STRUCTURE AND IMPLEMENT FOR POSITIONING THE LIGHT-RECEIVING EDGE OF THE LIGHT CONDUCTOR ONTO THE FOCUS OF THE LENS

BACKGROUND OF THE INVENTION

This invention retates to a structure and implement for positioning the light-receiving edge of a light conductor onto the focus of a lens.

It has often been the practice to focus solar ray by means of a lens, to guide solar rays into a light conductor and to transmit the solar ray through the light conductor to an optical desired position in order to use the solar ray for illumination or other purposes. One of such methods is to focus the solar ray by means of a Fresnel lens of about 40 cm diameter to guide the solar ray focussed by the lens into the light conductor having an edge surface of about 10 mm diameter arranged at the focus position of the lens, and to transmit the solar ray guided into the light conductor in such a manner through the light conductor to the optional desired position in order to use the solar ray for illumination or other purposes, for instance, as the light source for cultivating the plants in a room or an underground room, light source for nurturing the plants on the bottom of the sea, or the light source for culturing chlorella, etc. However, according to such method, the focal distance of the lens turns out to be longer, for instance, about 40 cm, and therefore the device becomes large-scaled or voluminous. And further, the light collecting energy for each lens increases so that a highly heat-proof material needs to be used as the member placed near to the focus position of the lens, and the operator may probably be in danger of suffering from burning the operator's hands, etc. at the focus position when the operator performs the adjustment work for positioning the edge surface of the light conductor onto the focus position of the lens, and so on. According to the method, a large number of small lenses having a diameter of about 4 cm are used, and the edge surface of an optical fiber of 1 through 2 mm diameter is arranged at the focus position of each lens. The light collected by each lens is guided into the respective optical fibers, and the light delivered from the respective optical fibers is guided into an optical conductor having a large diameter, for instance a diameter of 10 through 30 mm and transmitted to the optional desired position through the light conductor.

According to this method mentioned above, the focal distance of the lens turns out to be small, for instance, about 4 cm. Therefore, it may be possible to realize the device manufactured in a small-scaled and thin style. On the contrary, since a large number of lenses are used, it may be troublesome to position the light-receiving edge surface of the optical fiber onto the focus of each lens and perform its maintenance operation.

SUMMARY OF THE INVENTION

It is therefore an object of the present invention to provide a structure and implement for positioning the light-receiving edge of the optical fiber onto the focus of the lens.

It is another object of the present invention to provide a structure and implement for effectively collecting solar rays.

It is another object of the present invention to provide a structure and implement for protecting the operator from getting burnt, etc.

It is another object of the present invention to provide a structure and implement for enabling to simplify the adjustment work of positioning the light-receiving edge onto the focus position of the lens.

It is another object of the present invention to provide a structure and implement for facilitating the maintenance and management operation.

A structure and implement for positioning a light-receiving edge of an optical fiber onto the focus of a lens unitarily comprise a large number of lenses and a large number of optical fibers having a light-receiving edge arranged at the focus position of each lens. The structure and implement further comprise a base plate having a large number of holes bored in the direction of the optical axis of the lens. Each of the holes is bored corresponding to the focus position of the lens. The light-receiving edge of the optical fiber is inserted into each hole. The position of the optical fiber inserted into the hole is adjusted in the axial direction of the hole. After precisely positioning the light-receiving edge at the focus of the lens, the light-receiving edge is fixed at the position by means of a binding agent (adhesive).

The above and other objects, features and advantages of the present invention will become apparent from the following detailed descreption taken with the accompanying drawings.

DESCRIPTION OF THE PREFERRED EMBODIMENTS

The present invention relates to a structure for guiding with a high accuracy the light focussed by a lens into an optical fiber, that is to say, a structure and an implement for accurately positioning the light-receiving edge of the optical fiber onto the location of the lens focus.

Figure 1:
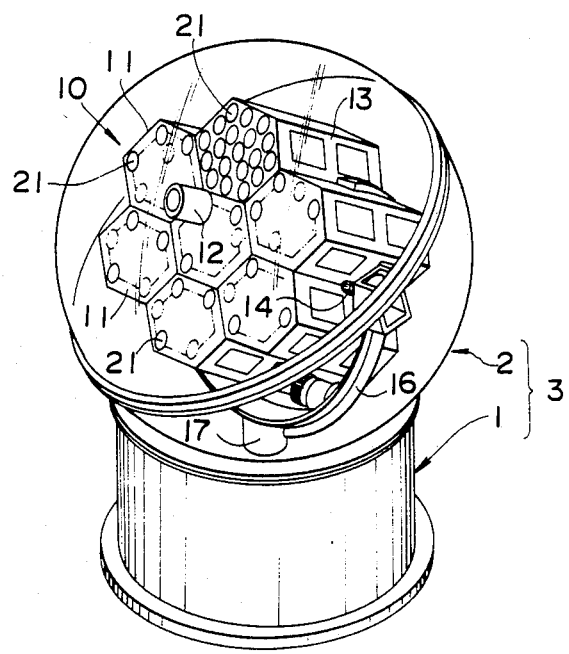
FIG. 1 is an outlined perspective view showing a solar ray collecting device as an example applied for the present invention.

FIG. 1 is an outlined perspective view showing a solar ray collecting device as an example applied for the present invention. In FIG. 1, 1 is a cylindrical base block, 2 is a dome-shaped head cover, and 3 is a capsule composed of the base block and the head cover for the solar ray collecting device. Under the usage condition, the solar ray collecting device 10 is accommodated in the capsule 2 as shown in FIG. 1. The solar ray collecting device 10 comprises a number of lens groups 11 (for example, in the figures, 7 lens groups are shown, but 19, 37 or 61 groups may be used) for focussing the solar ray, a direction sensor 12 for detecting the direction of the sun, a supporting frame 13 for unitarily retaining the lens groups and sensor, a first rotating shaft 14 for rotating the supporting frame 13, a supporting arm 16 for rotatably supporting the rotating shaft 14, and a second rotating shaft 17 for rotating the supporting arm 16 around the shaft crossing perpendicularly to the first rotating shaft 14. When the direction sensor 12 detects the direction of the sun, it generates the detection signal which controls the first and second rotating shafts so as to always direct the lens to the direction of the sun. The solar ray focussed by the lens groups is guided into an optical conductor cable or the like not shown, the light-receiving edge of which is arranged on the location of the lens focus, and the focus, and the focussed solar ray is transmitted onto the optical desired place through the optical conductor cable. And then, in the solar ray collecting device as mentioned above, each lens group 11 comprises a large number (for example 61 per one group) of lenses 21 of several centimeters diameter for example 4 cm, and the solar rays collected by each lens 21 are guided into an optical fiber per one lens. In order to effectively guide the solar ray focussed by each lens into the optical fiber, it is required that the light-receiving edge of the optical fiber is precisely positioned onto the position of lens focus. Especially, in the case of using a large number of lenses as stated heretofore, the positioning operation and the following maintenance turns out to be very troublesome.

The present invention has been done in view of the aforementioned situation. In particular, the present invention relates to the structure for accurately positioning the light-receiving edge of the optical fiber onto the position of the lens focus and the implement preferably used in the embodiment of the present invention, in a solar ray collecting device using a large number of lenses as mentioned above.

Figure 2:
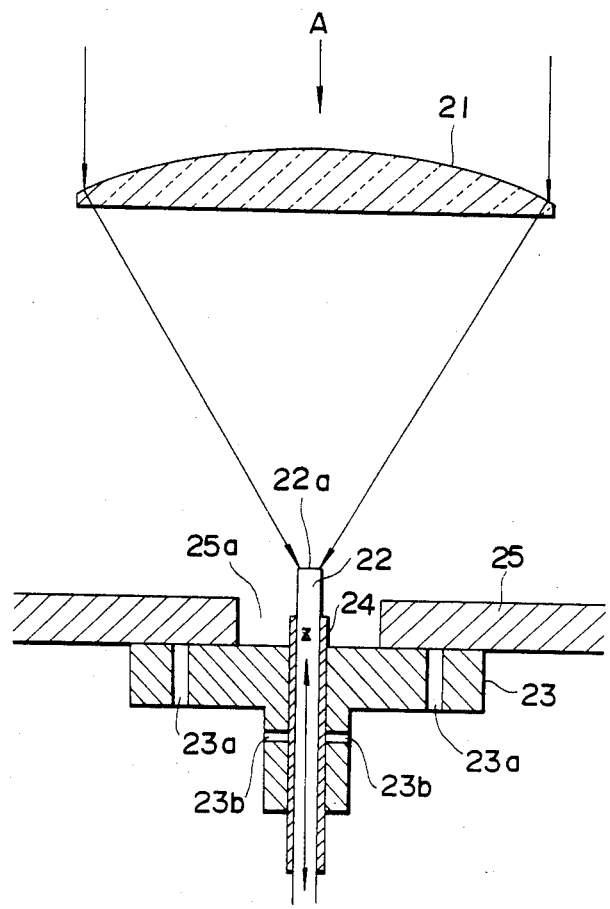
FIG. 2 is a diagram for explaining the construction of an embodiment according to the present invention.

FIG. 2 is a diagram for explaining the construction of an embodiment according to the present invention. In FIG. 2, 21 is a lens for focussing the solar ray, 22 is an optical fiber into which the solar ray collected by the lens 21 is guided, 23 is a retaining member for retaining the optical fiber 22, 24 is a sleeve which is unitarily mounted on the optical fiber 22 at the light-receiving side of the optical fiber 22, 25 is a supporting plate for supporting the lens 21 and the retaining member 23. The supporting plate 25 has a hole 25a on the optical axis of the lens 21. Further, the retaining member 23 has holes 23a for injecting an adhesive agent (liquid) in order to bind the retaining member 23 to the supporting plate 25 and other holes 23b for injecting an adhesive agent (liquid) in order to bind the sleeve 24 to the retaining member 23. And then, in order to position the light-receiving edge 22a of the optical fiber 22 onto the focus of the lens 21, the retaining member 23 is slid on the support plate 25" so as to let the center of the lens 21 coincide with that of the optical fiber 22, and then, adhesive agent liquid is injected inwardly through the hole 23a of the retaining member 23 to bind the member 23 to the supporting plate 25 under that condition kept. Next, the optical fiber 22 is moved in the direction of the Z-axis so as to position the light-receiving edge 22a of the optical fiber onto the focus of the lens 21. Keeping that condition, adhesive agent liquid is injected inwardly through the hole 23b of the retaining member 23 to bind the sleeve 24 to the retaining member 23. Furthermore, in order to let the center of the lens 21 coincide with that of the optical fiber 22, though the center of the optical fiber 22 may be positioned onto that of the Fresnel lens stripe pattern by observing it with the naked eyes in the case of the Fresnel lens, more generally, the side of the light-discharging edge of the optical fiber 22 is guided to a photometer or the like, the parallel rays just like laser rays, etc. being radiated onto the lens 21 from the direction shown by an arrow A, the position on which the indication value of the photometer turns out to be maximum is searched by sliding the retaining member 23 on the support plate 25 in such manner as mentioned above, and then, adhesive agent liquid is injected inwardly through the hole 23a on that position in order to fix the retaining member 23 to the supporting plate 25. Next, the position of the optical fiber 22 to the Z-axis direction is determined. Positioning of the optical fiber 22 to the Z-axis direction is performed in such a manner as afore-mentioned. That is to say, after fixing the retaining member 23 to the supporting plate 25, the optical fiber 22 is moved along the Z-axis direction for the purpose of searching the position at which the indication value of the photometer turns out to be maximum, and adhesive agent is injected inwardly through the hole 23b at that position in order to fix the sleeve unitarily constructed together with the optical fiber 22 to the retaining member 23.

As is apparent from the above-mentioned description, it might be possible to precisely and surely position the light-receiving edge surface of the optical fiber onto the position of the lens focus by use of the simple means and manufacturing process, according to the present invention. And then, since almost all for portions are constructed unitarily as a whole, there may be no need of the following maintenance.

What is claimed is:

1. In a structure for positioning the light-receiving edge of an optical conductor means, comprising a lens for focussing light, an optical conductor means having a light-receiving edge, said optical conductor means comprising an optical conductor fiber and a sleeve unitarily disposed about at least a portion of said optical conductor fiber, a supporting plate having an opening coaxial with the axis of said lens, a retaining member receiving said optical conductor means, said retaining member having one part in the form of a flange and another part in the form of a cylindrical section extending from said flange, said flange being perpendicular to the axis of said cylindrical section, said optical conductor means being disposed in said cylindrical section and in said opening in said supporting plate, first adhesive means for adhesively securing said flange to said support member, first adhesive-receiving means for receiving said adhesive means after said flange has been placed on said support plate in a position to dispose said optical conductor means in axial alignment with the optical axis of said lens, said first adhesive-receiving means comprising at least a first opening in said flange, said first opening having an end portion opening up onto a section of said support member such that said first adhesive means is disposed in said first opening and contacts said section on said support member, second adhesive means for adhesively securing said optical conductor means to said cylindrical section, second adhesive-receiving means on said cylindrical section for receiving said second adhesive means affter said optical conductor means has been longitudinally placed in a position in said cylindrical section such that said light receiving edge is at the focus of said lens, said second adhesive-receiving means comprising at least one second opening in said cylindrical section of said retaining member, said second opening having an end portion opening up onto a section of said sleeve such that said second adhesive means is disposed in said second opening and contacts said sleeve of said optical conductor means, whereby said light-receiving edge of said optical conductor means is precisely positioned at the focus of said lens.

2. In a structure according to claim 1, wherein a plurality of said first openings are provided in said flange of said retaining member.

3. In a structure according to claim 1, wherein a plurality of said second openings are provided in said cylindrical section of said retaining member.

* * * * *